(12) United States Patent
McDaniel et al.

(10) Patent No.: US 8,004,539 B2
(45) Date of Patent: Aug. 23, 2011

(54) SYSTEMS AND METHODS FOR IMPROVED GRAPHICAL PARAMETER DEFINITION

(75) Inventors: Richard McDaniel, Oakland, CA (US); Daniel Benson, Berkeley, CA (US)

(73) Assignee: Siemens Aktiengesellschaft, München ( * ) Notice: Subject to any disclaimer, the term of this patent is extended or adjusted under 35 U.S.C. 154(b) by 381 days.

(21) Appl. No.: 11/111,293

(22) Filed: Apr. 20, 2005

(65) Prior Publication Data

US 2006/0082597 A1 Apr. 20, 2006

Related U.S. Application Data

(60) Provisional application No. 60/620,995, filed on Oct. 20, 2004.

(51) Int. Cl.
*G09G 5/00* (2006.01)

(52) U.S. Cl. ......... 345/619; 345/650; 345/661; 345/676

(58) Field of Classification Search ............... 345/650, 345/655, 672, 681, 661, 676
See application file for complete search history.

(56) References Cited

U.S. PATENT DOCUMENTS

| | | | | |
|---|---|---|---|---|
| 5,588,098 A * | 12/1996 | Chen et al. | ..... | 345/653 |
| 5,861,889 A * | 1/1999 | Wallace et al. | ..... | 345/619 |
| 5,894,310 A * | 4/1999 | Arsenault et al. | ..... | 345/679 |
| 5,900,874 A * | 5/1999 | Shrader et al. | ..... | 715/846 |
| 5,990,901 A * | 11/1999 | Lawton et al. | ..... | 345/581 |
| 5,995,107 A * | 11/1999 | Berteig et al. | ..... | 345/420 |
| 6,295,069 B1 * | 9/2001 | Shirur | ..... | 345/420 |
| 6,362,839 B1 * | 3/2002 | Hamilton et al. | ..... | 715/764 |
| 6,426,745 B1 * | 7/2002 | Isaacs et al. | ..... | 345/419 |
| 6,448,964 B1 * | 9/2002 | Isaacs et al. | ..... | 345/419 |
| 6,509,915 B2 * | 1/2003 | Berman et al. | ..... | 715/840 |
| 6,781,597 B1 * | 8/2004 | Vrobel et al. | ..... | 345/619 |
| 7,249,327 B2 * | 7/2007 | Nelson et al. | ..... | 715/782 |
| 7,302,650 B1 * | 11/2007 | Allyn et al. | ..... | 715/859 |
| 7,324,121 B2 * | 1/2008 | Young | ..... | 345/689 |
| 7,330,198 B2 * | 2/2008 | Yamaguchi et al. | ..... | 345/653 |
| 7,430,713 B2 * | 9/2008 | Kobashi et al. | ..... | 715/244 |
| 7,610,563 B2 * | 10/2009 | Nelson et al. | ..... | 715/839 |

* cited by examiner

*Primary Examiner* — M Good Johnson
(74) *Attorney, Agent, or Firm* — Donald B. Paschburg

(57) ABSTRACT

Systems, methods and computer program code for improved graphical parameter definition may comprise, (i) receiving, by a graphical editing tool, a command associated with a graphical editing operation directed to performing a transformation to a graphical object, wherein the transformation is associated with changing a value of a first parameter of the graphical object, (ii) displaying, by the graphical editing tool, a transformation object associated with the transformation, wherein the transformation object comprises a second parameter comprising a value associated with the transformation, and wherein the value of the first parameter of the graphical object is related to the value of the second parameter, (iii) receiving, by the graphical editing tool, an indication associated with defining the transformation object as a new parameter of the graphical object, and (iv) defining, by the graphical editing tool, the transformation object as the new parameter of the graphical object.

39 Claims, 10 Drawing Sheets

SYSTEMS AND METHODS FOR IMPROVED GRAPHICAL PARAMETER DEFINITION

CROSS-REFERENCE TO RELATED APPLICATIONS

This application claims priority and benefit under 35 U.S.C. §119(e) to U.S. Provisional Patent Application Ser. No. 60/620,995 entitled "Interactive Method for Adding Parameters to a Graphical Model", filed in the name of McDaniel et al. on Oct. 20, 2004, the contents of which are hereby incorporated by reference in their entirety for all purposes.

BACKGROUND

The present disclosure relates generally to systems and methods for improved graphical parameter definition and, more particularly, to the interactive application of graphical parameters to a graphical model.

Computerized graphical editing tools are commonly utilized to produce a wide variety of graphical images. Some graphical editing tools are directed to creating and editing static drawings, while other graphical editing tools are directed to producing and manipulating dynamic or animated figures. In either case, the images are often defined structurally. In other words, the images may be defined by information beyond that which is displayed when rendering the images. An image may be defined by one or more parameters, for example, that govern the appearance of the image, how the image behaves, and/or how the image is related to other images. In three-dimensional drawings, the image parameters may be interrelated to form a three-dimensional model that is used to compute and render a requested two-dimensional display image representing the three-dimensional drawing. Many graphical editing tools allow image parameters to be directly manipulated via a Graphical User Interface (GUI).

An example of a direct manipulation of an exemplary drawing 100 is shown in FIG. 1. The exemplary drawing 100 may, for example, comprise a rectangular (as shown) and/or other shape of graphical object 102 that is created and/or otherwise defined by a user. The user may, in some configurations, interface with a GUI to define the graphical object 102. The graphical object 102 may, for example, be created by selecting a rectangle object and/or rectangle creation tool (not shown) and dragging (e.g., with a mouse or other pointing device) the rectangle object into the exemplary drawing 100 to create the rectangular graphical object 102. The user may then mouse-over, click on, and/or otherwise select the graphical object 102 to begin manipulation of the graphical object 102.

In some configurations, the graphical object 102 may be supplemented with editing handles 104 to both indicate that the graphical object 102 is selected and to provide points via which the graphical object 102 may be transformed. The editing handles 104 are implicit to the selection operation performed on the graphical object 102, and are not actual parts of the exemplary drawing 100 and/or the graphical object 102 (e.g., they disappear when the graphical object 102 looses focus). In the exemplary drawing 100, the user may desire to transform the graphical object 102 via rotation.

For example, once the graphical object 102 is selected, the user may select a rotation tool (not shown) and/or otherwise issue a rotation command. In some configurations, a center of rotation pointer 106 may then be displayed along with the graphical object 102. In some graphical editing tools, the center of rotation pointer 106 may be displayed in a default position such as at the center of the graphical object 102 (as shown in FIG. 1). Similar to the editing handles 104, the center of rotation pointer 106 and/or any parameters associated therewith (e.g., coordinates of the center of rotation) are not actual parts of the drawing, they are simply implicit to the associated editing operation (e.g., the rotation in the exemplary drawing 100).

The user may, according to some configurations, reposition the center of rotation pointer 106 (e.g., by dragging it with a mouse pointer) as desired. The user may then, for example, transform the graphical object 102 by rotating it from a first orientation A to a second orientation B. The graphical object 102 may be rotated about the center of rotation pointer 106 to define the angle of rotation 108. In some graphical editing tools, a value of the angle or rotation 108 may be directly entered by the user to obtain precise rotational transformations of the graphical object 102.

In some situations, the user may desire to derive one or more new parameters for the graphical object 102. The user may add parameters to the graphical object 102, for example, to utilize the graphical object 102 in an animation, game, and/or simulation. In some configurations, the added parameters may be derived from other existing parameters of the graphical object 102. The derived parameters may, for example, comprise parameters that may be formed from reversible expressions defined by the user. As an example, one typical method of animating an object (like the graphical object 102) involves utilizing "key frames". The user may define, for example, how the graphical object 102 should look at specific points in time. In the example drawing 100, the user may rotate the graphical object 102 and then define the new orientation (orientation B) as the orientation the graphical object 102 should have at a specific point in time. The user may then further rotate and/or transform the graphical object 102 and define further orientations for other points in time. An animation system may then, for example, interpolate the values for the parameters of the graphical object 102 between the key frames to determine how to display the "movement" of the graphical object 102.

Adding parameters such as derived parameters to the graphical object 102 typically requires the user to use a method such as "key frames" and/or requires the user to manipulate parameter data via a parameter list (which may exist in a separate editing tool and/or window). The user of typical graphical editing tools may not be able to directly define and/or derive parameters within the drawing 100 and/or may not otherwise be able to easily define a graphical transformation (e.g., the rotation in FIG. 1) as a derived parameter for the graphical object 102.

Accordingly, there is a need for systems and methods for improved graphical parameter definition that address these and other problems found in existing technologies.

SUMMARY

Methods, systems, and computer program code are therefore presented for improved graphical parameter definition.

According to some embodiments, systems, methods, and computer code are operable to (i) receive a command associated with a graphical editing operation directed to performing a transformation to a graphical object, wherein the transformation is associated with changing a value of a first parameter of the graphical object, (ii) display a transformation object associated with the transformation, wherein the transformation object comprises a second parameter comprising a value associated with the transformation, and wherein the value of the first parameter of the graphical object is related to the value of the second parameter, (iii) receive an indication associated with defining the transformation object as a new parameter of the graphical object, and (iv) define the transformation object as the new parameter of the graphical object.

With these and other advantages and features of embodiments that will become hereinafter apparent, embodiments may be more clearly understood by reference to the following detailed description, the appended claims and the drawings attached herein.

DETAILED DESCRIPTION OF SPECIFIC EMBODIMENTS

Figure 1:
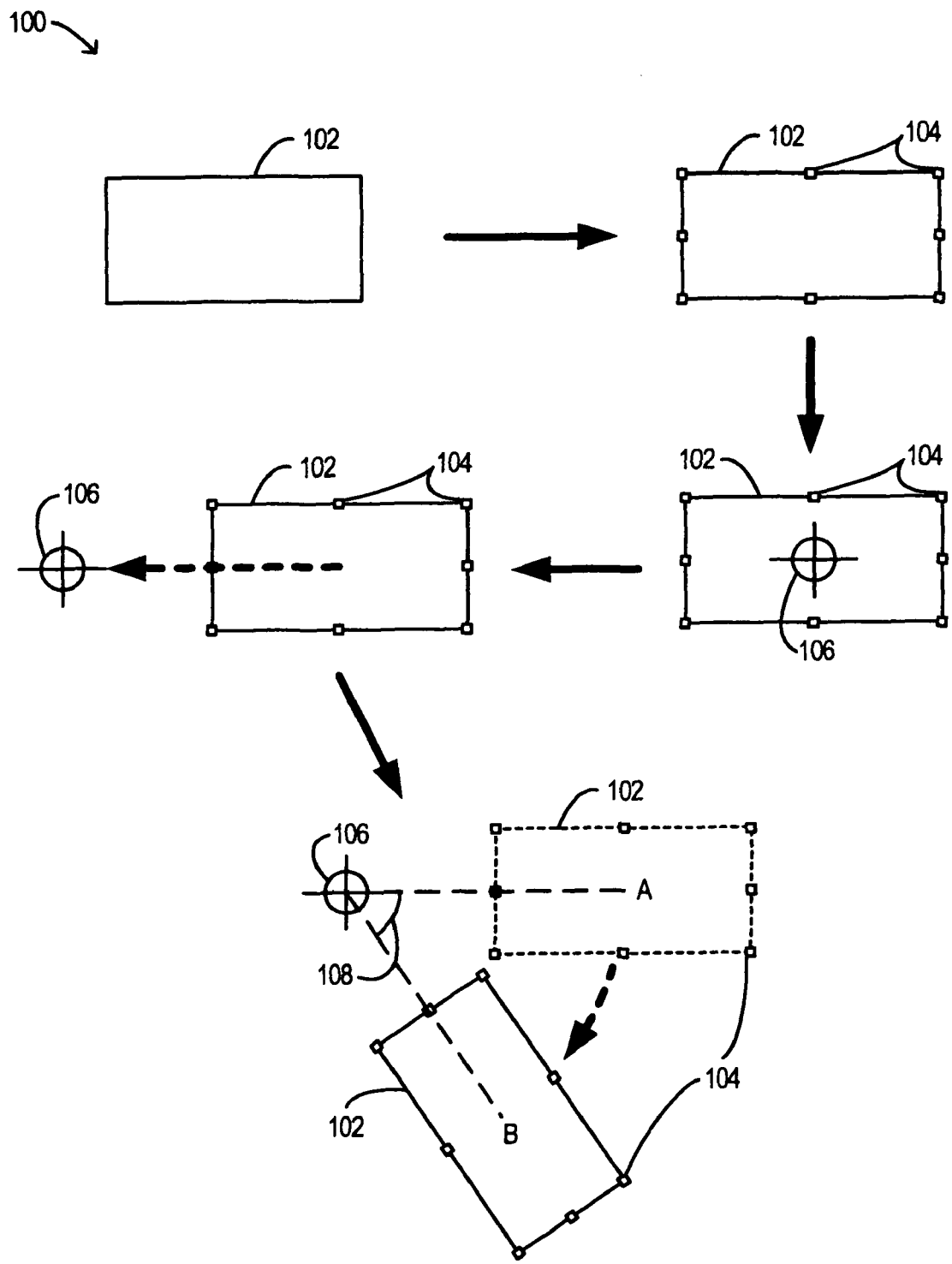
FIG. 1 is a block diagram of an exemplary drawing.

Some embodiments described herein are associated with a "graphical image" or a "graphical object". As used herein, the terms "graphical image" and "graphical object" may be used interchangeably and may generally refer to any item or object associated with a drawing, figure, model, and/or other graphical and/or visual expression. Examples of graphical objects may include, but are not limited to, shapes, lines, points, and/or any groupings and/or combination thereof. In some embodiments, a graphical object may be or include one or more hidden lines and/or objects. Graphical objects may, according to some embodiments, be static, dynamic, and/or multi-dimensional. In some embodiments, a graphical object may comprise a single simple shape such as the rectangular graphical object 102 shown in FIG. 1. According to some embodiments, a graphical object may comprise any number and/or type of graphical objects or images and/or components thereof.

Some embodiments described herein are associated with a "parameter". As used herein, the term "parameter" may generally refer to any variable, value, identifier, attribute, and/or other information associated with a graphical object. Parameters may include, for example, values defining graphical object properties such as horizontal, vertical, and/or three-dimensional position, color, dimensions, text field contents, and/or any other type of property that is or becomes known. Some parameters may be or include "derived parameters" that are formed from expressions and/or functions that relate the derived parameter to one or more other parameters upon which it is dependent. Derived parameters having values that may be modified by a user may, according to some embodiments, be defined by one or more reversible expressions.

Figure 2:
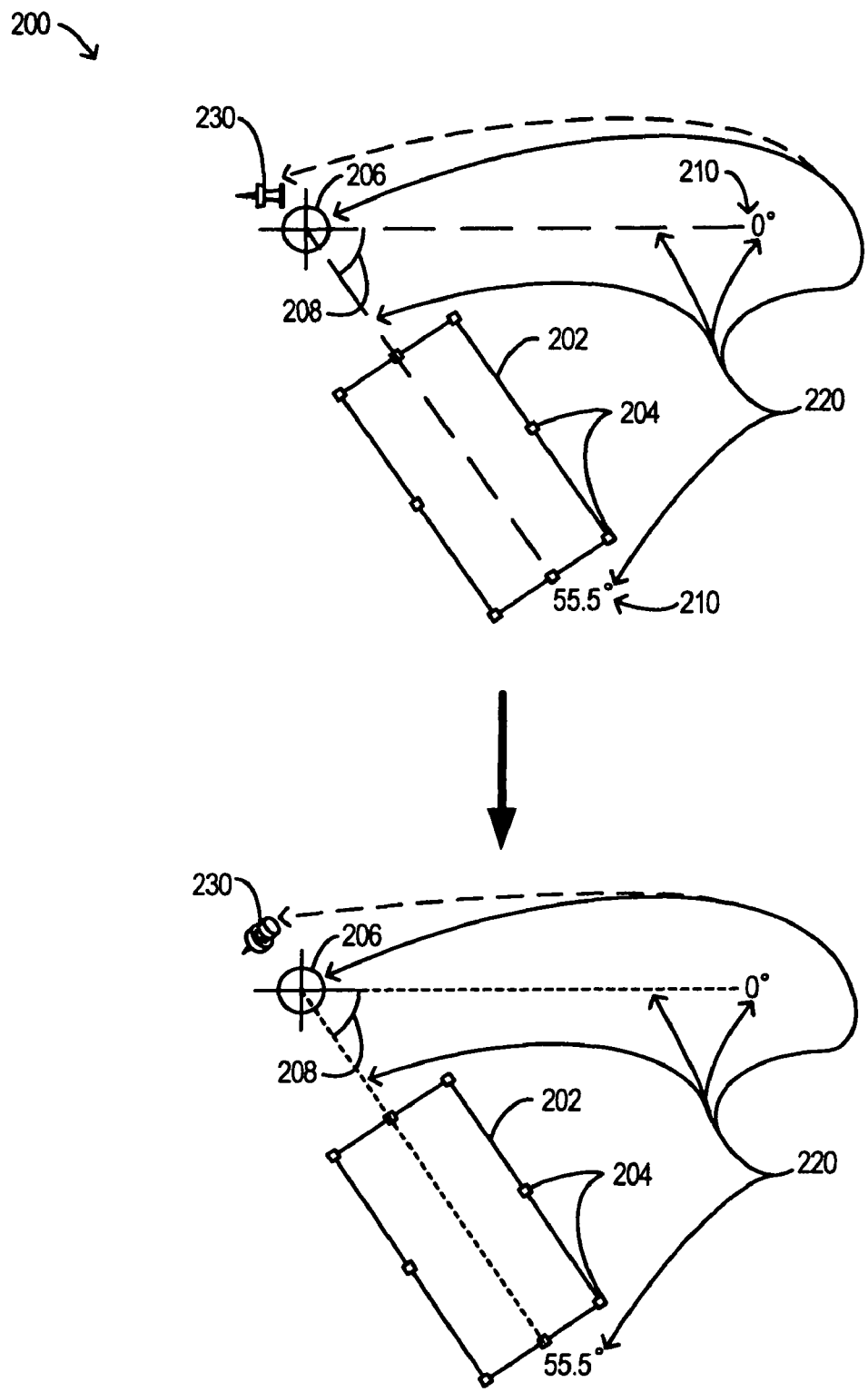
FIG. 2 is a block diagram of an exemplary drawing according to some embodiments.

Referring to FIG. 2, a block diagram of an exemplary drawing 200 according to some embodiments is shown. The various drawings and systems described herein are depicted for use in explanation, but not limitation, of described embodiments. Different types, layouts, quantities, and configurations of any of the drawings and systems described herein may be used without deviating from the scope of some embodiments. Fewer or more components than are shown in relation to the drawings and systems described herein may be utilized without deviating from some embodiments.

The exemplary drawing 200 may comprise, for example, a graphical object 202. The graphical object 202 may, according to some embodiments, be similar to the graphical object 102 described in conjunction with FIG. 1. The graphical object 202 may, for example, have been selected by a user (e.g., as indicated by the editing handles 204) and rotated about a center of rotation pointer 206 to define an angle of rotation 208. In some embodiments, the angle of rotation 208 may be indicated by one or more angle value identifiers 210. The angle value identifiers 210 may, as shown in FIG. 2 for example, provide visual information (e.g., numerical angle values) indicating characteristics of the angle of rotation 208.

According to some embodiments, the user may select one or more of the angle value identifiers 210 to edit the angle of rotation 208. The user may also or alternatively drag and/or otherwise reposition the graphical object 202 to alter the angle of rotation 208. In some embodiments, the center of rotation pointer 206, the angle value identifiers 210, and/or other information (e.g., axis lines) may comprise a transformation object 220 associated with the rotation of the graphical object 202. The transformation object 220 may, for example, be a marker and/or other object that provides a visual indication of the transformation (e.g., the rotation and/or another transformation) of the graphical object 202. According to some embodiments, the transformation object 220 may be positioned in conjunction with the graphical object 202 in a manner associated with the transformation. The transformation object 220 representing the rotation in FIG. 2, for example, may be positioned to show the center of rotation (e.g., via the center of rotation pointer 206), the axis of rotation, values associated with the rotation (e.g., the angle value identifiers 210), and/or other location-specific data. In some embodiments, the transformation object 220 may provide an interface with which the user may establish the transformation as a new parameter of the graphical object 202.

For example, the user may utilize a graphical editing tool to create the exemplary drawing 200 which includes the graphical object 202. The user may then, according to some embodiments, transform the graphical object 202 such as by rotating the graphical object 202 about the center of rotation pointer 206 to define the angle of rotation 208. In some embodiments, the transformation object 220 may then be displayed. According to some embodiments, multiple transformation objects 220 associated with the most recent transformations may be displayed. Transformation objects 220 may also or alternatively be removed and/or hidden after a certain amount of time has elapsed and/or after a certain amount of transformations have occurred. In some embodiments, a transformation object 220 may be displayed to represent the last transformation. According to some embodiments, multiple transformation objects 220 may be displayed simultaneously.

According to some embodiments, the user may mouse-over, click, and/or otherwise select the transformation object 220. In some embodiments, the selection of the transformation object 220 may indicate the desire to define the transformation represented by the transformation object 220 as a new parameter of the graphical object 202. According to some embodiments, the user may also or alternatively submit and/or indicate a command that signifies the intent to define the transformation as a new parameter. In some embodiments, the user may perform a series of commands to edit the transformation object 220 and/or may perform one or more other commands to indicate that the transformation object 220 is to be defined as a new parameter of the graphical object 202.

In some embodiments, an icon and/or other image, device, or object may be displayed in conjunction with and/or as part of the transformation object 220. As shown in FIG. 2, for example, a thumbtack icon 230 may be displayed with, as part of, and/or near the transformation object 220. According to some embodiments, the user may select the thumbtack icon 230 to indicate intent to define the transformation as a new parameter of the graphical object 202. Upon selection of the thumbtack icon 230, for example, the information associated with the transformation may be converted to and/or may otherwise be defined as a parameter of the graphical object 202. In some embodiments, the new parameter may comprise a derived parameter (e.g., as is the case with the exemplary rotational transformation). The graphical editing tool may, for example, create, define, and/or otherwise determine one or more expressions that relate the new parameter to one or more existing parameters of the graphical object 202.

In some embodiments, the transformation object 220 and/or the thumbtack icon 230 may be altered upon definition of the new parameter. For example, the thumbtack icon 230 may, upon being selected by the user, convert and/or change to show the thumbtack "stuck into" the drawing 200. The transformation object 220 may also or alternatively change upon definition of the new parameter. The line style (as shown in FIG. 2) and/or other properties of the transformation object 220 may, in some embodiments, change to reflect the selection of the transformation as a new parameter. The transformation object 220 may, according to some embodiments, be or include an actual object and/or graphical object within the drawing 200. The transformation object 220 may, for example, have its own parameters related to but separately editable from the parameters of the graphical object 202.

According to some embodiments, the user may manipulate the transformation object 220 to edit and/or alter the new parameter. The user may select the transformation object 220, for example, and right-click and/or otherwise initiate a menu via which the user may edit parameters of the transformation object 220. In some embodiments, the expressions created to define the transformation associated with the transformation object 220 as the new parameter may be utilized (e.g., by the graphical editing tool) to alter the parent parameters in the case that the new parameter is directly modified. In such a manner, for example, the user may be able to transform the graphical object 202 and quickly and easily define new parameters for the graphical object 202. According to some embodiments, a single graphical editing tool may be utilized to accomplish the interactive parameter definition.

Figure 3:
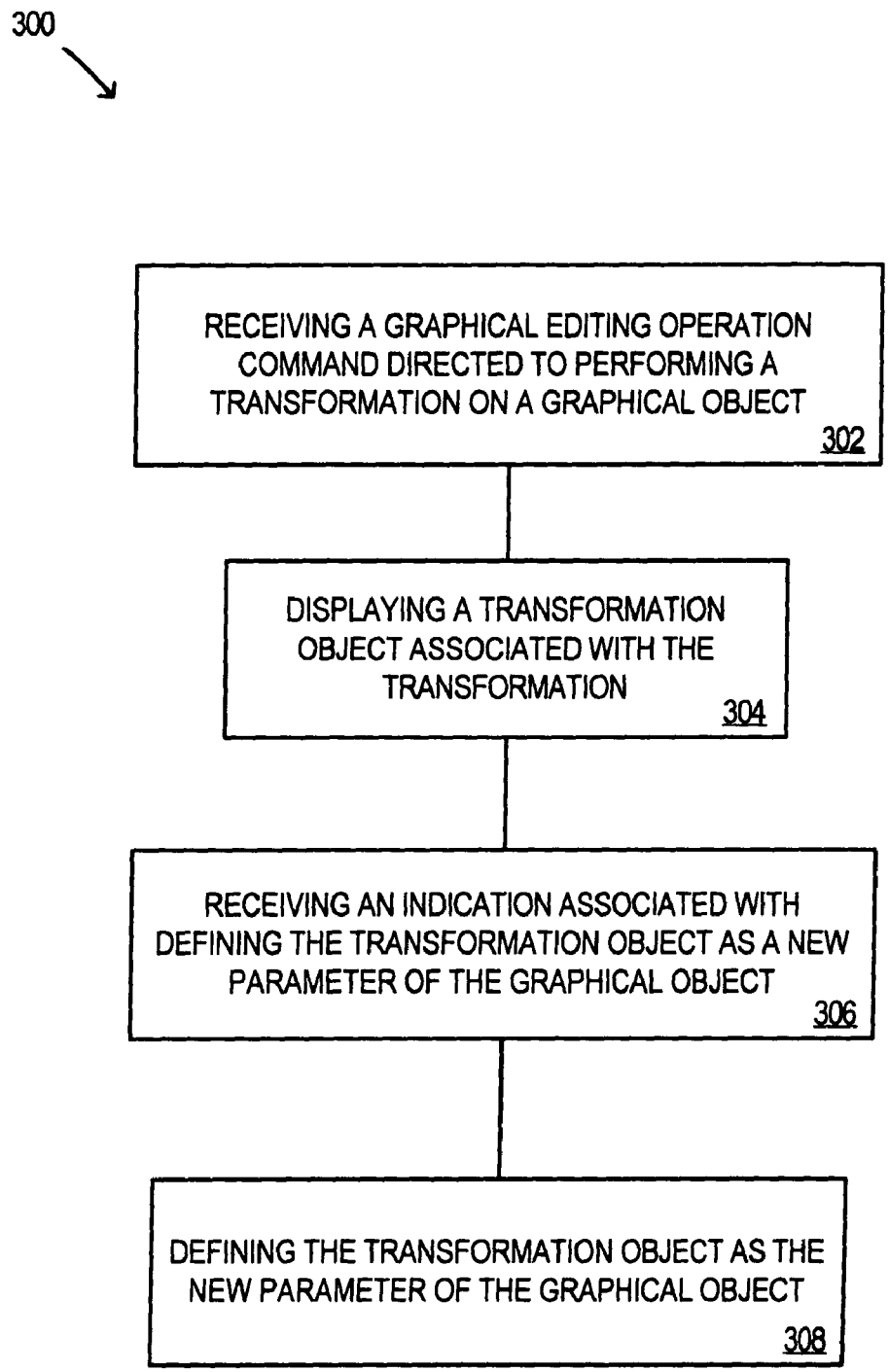
FIG. 3 is a flowchart of a method according to some embodiments.

Turning now to FIG. 3, a method 300 according to some embodiments is shown. In some embodiments, the method 300 may be associated with the exemplary drawings 100, 200 and/or any of the components thereof as described in conjunction with any of FIG. 1 and/or FIG. 2. The method 300 may, for example, be performed by a graphical editing tool to allow a user to interactively define graphical object parameters in accordance with embodiments described herein.

The flow diagrams described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

According to some embodiments, the method 300 may begin at 302 by receiving a command associated with a graphical editing operation directed to performing a transformation to a graphical object. In some embodiments, the transformation may be associated with changing a value of a first parameter of the graphical object. For example, a graphical editing tool may be commanded by a user to transform a graphical object (such as the graphical objects 102, 202). In some embodiments, the user may interface with the graphical editing tool and/or provide the command via a GUI. According to some embodiments, the graphical object may also or alternatively be created by the user (e.g., utilizing the graphical editing tool).

The command may be or include, according to some embodiments, any type or configuration of command and/or indication directed to transforming a graphical object that is or becomes known. The user may, for example, select a graphical editing tool from a menu or toolbar, drag a mouse pointer to move, resize, and/or otherwise manipulate a graphical object, and/or utilize any other available menu command or action to transform the graphical object (and/or group of graphical objects). In some embodiments, the command may be directed to performing one or more specific types of editing operations. The command may, for example, be associated with moving (translating), resizing, rotating, and/or other graphical editing operations. In some embodiments, the command may be categorized according to the type of editing operation (and/or operations) with which it is associated.

The transformation to be effectuated by the command may, according to some embodiments, be directed to changing a value of a first parameter of the graphical object. In the case that the transformation and/or command are directed to moving or rotating the graphical object, for example, one or more location and/or coordinate parameters of the graphical object may be altered (e.g., values may be changed) in accordance with the transformation and/or command. In some embodiments, the first parameter may be or include a plurality of parameters of the graphical object.

According to some embodiments, the method 300 may continue at 304 by displaying a transformation object associated with the transformation. The transformation object may, for example, be or include an object such as the transformation object 220 as described in conjunction with FIG. 2. According to some embodiments, the transformation object may be selected for display based at least in part on the command received at 302. For example, one or more transformation objects may be associated with the various editing operations that are capable within the graphical editing tool. In some embodiments, the category of editing operation associated with the command may be utilized to determine a transformation object for display.

In a preferred embodiment, a marker can be converted by clicking on a special region of the marker such as a "thumbtack." In other embodiments, the user may use a menu command or group the marker with the object being manipulated to convert it into a parameter. If the user does not convert the marker into a parameter, then the marker will eventually disappear when the user performs other operations or manipulations. In another embodiment, the marker may disappear after a short period of time elapses.

In a preferred embodiment, the system will hide the markers that have been converted into parameters as the user performs other operations on other objects. The marker will reappear if the user reselects the object. This allows the user to manage and modify the parameter. For instance, to remove the parameter, the user may select and delete the marker. The markers, once converted into parameters act like other objects within the image.

In the case that the command is directed to performing a rotational transformation editing operation, for example, the graphical editing tool may determine that the appropriate transformation object for display includes a rotational transformation object. The rotational transformation object may comprise, for example, a center of rotation pointer and/or one or more lines and/or angle markers to represent the rotational transformation. According to some embodiments, the transformation object may be positioned relative to the graphical object being transformed. The center of rotation pointer of the transformation object may, for example, be appropriately positioned with respect to the graphical point about which the graphical object is to be rotated (and/or has been rotated).

In some embodiments, the user may continue to transform the graphical object and/or provide commands associated with transforming the graphical object. The graphical editing tool may also or alternatively continue to display transformation objects associated with received user commands. According to some embodiments, transformation objects may be displayed for a certain number of the most recent translations and/or commands. Older transformations (e.g., in time and/or order) may, according to some embodiments, be removed from the display and/or drawing.

In some embodiments, the transformation object may comprise a second parameter (and/or a plurality of parameters). In the case that the transformation object represents the rotational transformation, for example, the transformation object may comprise an angle of rotation parameter that is defined by how the graphical object was (and/or is to be) rotated by the user. As shown in the exemplary drawing 200 of FIG. 2, for example, the graphical object 202 is rotated to define an angle of fifty-five and one-half degrees. In some embodiments, the second parameter (e.g., of the transformation object) may be related to the first parameter of the graphical object.

For example, the change in value of the location of the points defining the graphical object (e.g., the changes in the first parameter) may define the angle of rotation (e.g., the value of the second parameter). The second parameter may, for example, be derived from and/or at least partially from the first parameter. In some embodiments, the relationship may be reversible. The value of the angle of rotation parameter (e.g., the second parameter) may be altered by the user, for example, to change the values of the locations of the points defining the graphical object (e.g., the first parameter). According to some embodiments, the graphical editing tool may determine the relationships and/or expressions (e.g., mathematical expressions) that relate the first and second parameters. The expressions may, for example, be associated with the transformation object displayed to represent the transformation.

In some embodiments, the method 300 may continue by receiving an indication associated with defining the transformation object as a new parameter of the graphical object, at 306. In an effort to animate the graphical object, for example, the user may indicate that the rotational transformation in the exemplary drawings 100, 200 is to be defined as a new parameter of the graphical object. The indication may be received via any method or means that is or becomes known or available. For example, the user may utilize an input device (e.g., a mouse and/or keyboard) to select the transformation object and/or to indicate the intent to define the transformation object as the new parameter.

According to some embodiments, such as described in conjunction with the exemplary drawing 200 in FIG. 2, for example, the user may select an icon such as the thumbtack icon 230 to provide the indication. The graphical editing tool may receive the indication (e.g., the mouse click and/or mouse over) and determine that the transformation object is to be defined as a new parameter of the graphical object.

In some embodiments, the method 300 may continue at 308 by defining the transformation object as the new parameter of the graphical object. The graphical editing tool may, for example, determine, create, and/or otherwise define the expressions that relate the second parameter of the transformation object to the first parameter of the graphical object. The graphical editing tool may also or alternatively assign the expressions, the transformation object, and/or the second parameter as a property, attribute, and/or other new parameter of the graphical object. In such a manner, for example, the graphical object may easily be rotated in accordance with the transformation object by simply changing the value of the new parameter of the graphical object. In other words, the user may easily and effectively utilized graphical editing concepts (e.g., within a graphical editing tool) to define and/or derive transformation parameters for a graphical object.

Figure 4:
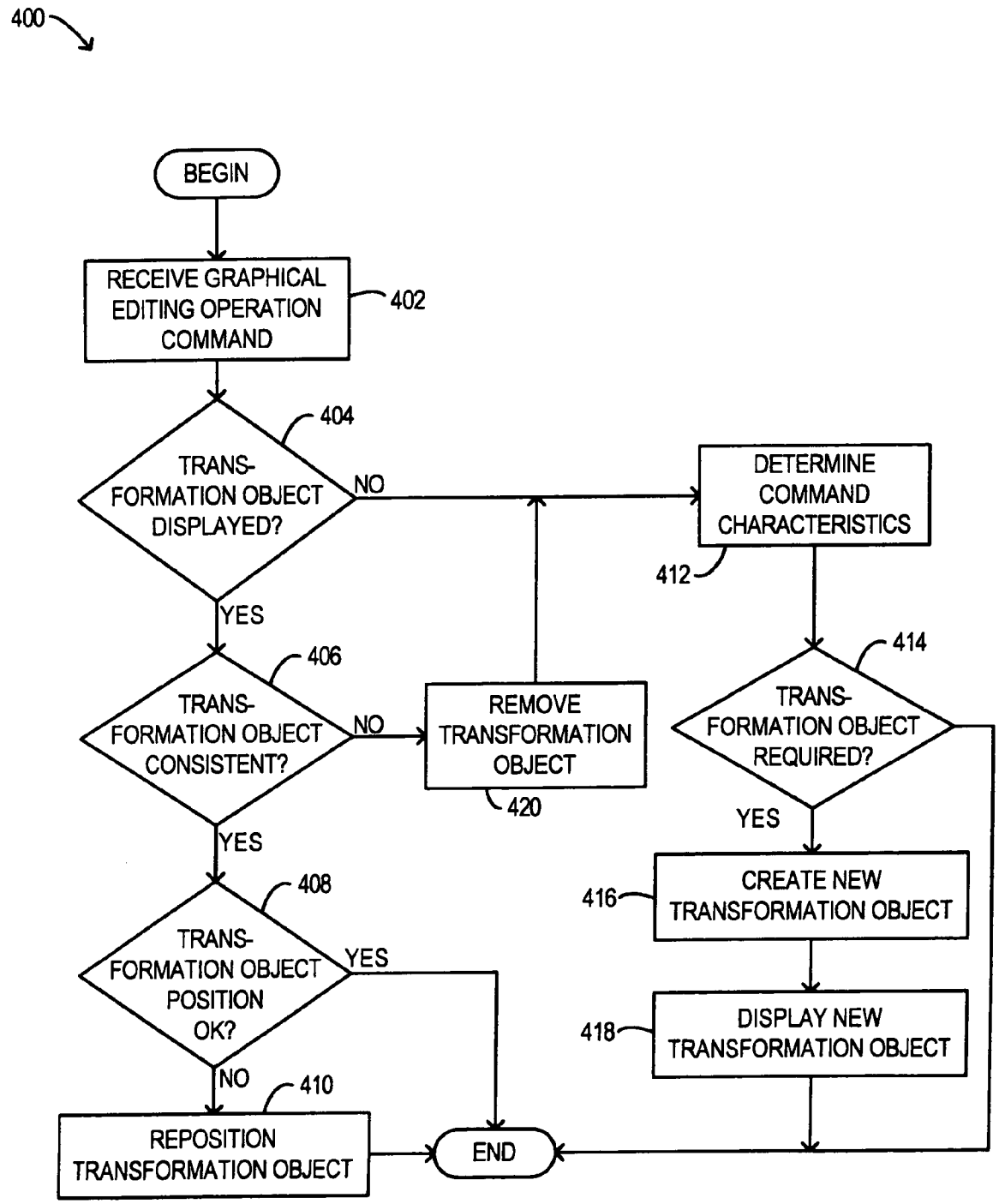
FIG. 4 is a flowchart of a method according to some embodiments.

Turning now to FIG. 4, a method 400 according to some embodiments is shown. In some embodiments, the method 400 may be associated with the exemplary drawings 100, 200 and/or any of the components thereof as described in conjunction with any of FIG. 1 and/or FIG. 2. The method 400 may also or alternatively be associated with the method 300 and/or any of the procedures thereof. For example, the method 400 may be associated with managing the display and/or treatment of the transformation objects described in conjunction with the method 300.

The method 400 may begin, for example, at 402 to receive a graphical editing operation command. In some embodiments, the command may be similar to the command received at 302. The command may, for example, be associated with performing a graphical editing operation (e.g., rotation and/or translation) and/or transformation to a graphical object. According to some embodiments, the method 400 may continue to determine if a transformation object is displayed at 404. For example, a graphical editing tool may receive the command at 402 and may determine if a transformation object (such as the transformation object 220) associated with the command is currently being displayed. If a transformation object is being displayed for the command and/or the transformation associated therewith, the method 400 may continue, according to some embodiments, to determine at 406 if the transformation object is consistent with the command.

For example, if the currently displayed transformation object is configured to represent a rotational transformation but the command is associated with a different type of transformation, then the transformation object may be determined to be inconsistent with the command. In the case that the transformation object is determined to be consistent with the command, the method 400 may continue, according to some embodiments, by determining if the transformation object is in the correct position, at 408. For example, if the transformation object is determined to be located appropriately with respect to the graphical object being transformed, then the method 400 may simply end. In the case that the transformation object is determined to not be properly located with respect to the graphical object, the method 400 may continue to reposition the transformation object, at 410. If the user repositions the graphical object, for example, a transformation object associated with a previous rotation of the graphical object may also be repositioned to maintain a proper orientation with respect to the graphical object. In some embodiments, once the transformation object is repositioned at 410, the method 400 may end.

In the case that is determined at 404 that no transformation object is currently displayed, the method 400 may, according to some embodiments, continue to determine one or more characteristics of the command, at 412. The graphical editing tool may, for example, determine the category of editing operation that is associated with the command. In some embodiments, the category of the command may be pre-determined, derived, queried, looked-up, and/or otherwise determined. According to some embodiments, the method 400 may continue to determine if a transformation object is required for the command, at 414. For example, in the case that the command is associated with an editing operation that does note require a transformation object, the method 400 may simply end (e.g., because no transformation object is displayed, and no transformation object is required). In the case that the command is associated with an editing operation type that does require a transformation object (and/or is desirable to have a transformation object for), the method 400 may, for example, continue to create a new transformation object at 416.

In some embodiments, the new transformation object may be selected, created, and/or otherwise determined based upon the command and/or the editing operation type associated with the command. A number of various available transformation object may, for example, be stored and/or associated with various editing operation types. The creation of the new transformation object may, according to some embodiments, comprise extracting transformation information from the command to define one or more parameters associated with the transformation object. The new transformation object may, for example, be configured to represent and/or display information associated with the transformation (e.g., angle of rotation and/or center of rotation coordinates).

In some embodiments, the new transformation object may be displayed (e.g., to the user and/or via a GUI) at 418. The method 400 may then, for example, end and/or wait until receiving another command (e.g., at 402) prior to re-initiating and/or continuing. According to some embodiments, if the transformation object that is determined to be currently displayed at 404 is not determined to be consistent with the command, the method 400 may proceed to 420 to remove the inconsistent transformation object. The method 400 may then, for example, proceed to 412 to determine, in the absence of a transformation object, one or more characteristics of the command that may indicate whether a transformation object is needed.

According to some embodiments, the method 400 may also or alternatively determine if and/or when a consistent transformation object is to be removed and/or hidden. If the user has not interfaced with the transformation object for a certain period of time and/or has performed many transformations since the transformation object was initially displayed, for example, the transformation object may be determined to be unnecessary and/or old. Old and/or unnecessary transformation object may, in some embodiments, be removed and/or hidden to reduce clutter in the drawing. In some embodiments, the method 400 may be simplified and/or reduced. Every received editing operation command at 402, for example, may simply spawn a transformation object (e.g., a replacement for an existing transformation object or an entirely new transformation object). In either case, the method 400 may be transparent to a user. The method 400 may take place substantially instantaneously, for example, such that any transformation objects that are replaced are done so with such speed that the user may not be likely to notice the replacement procedure.

Figure 5:
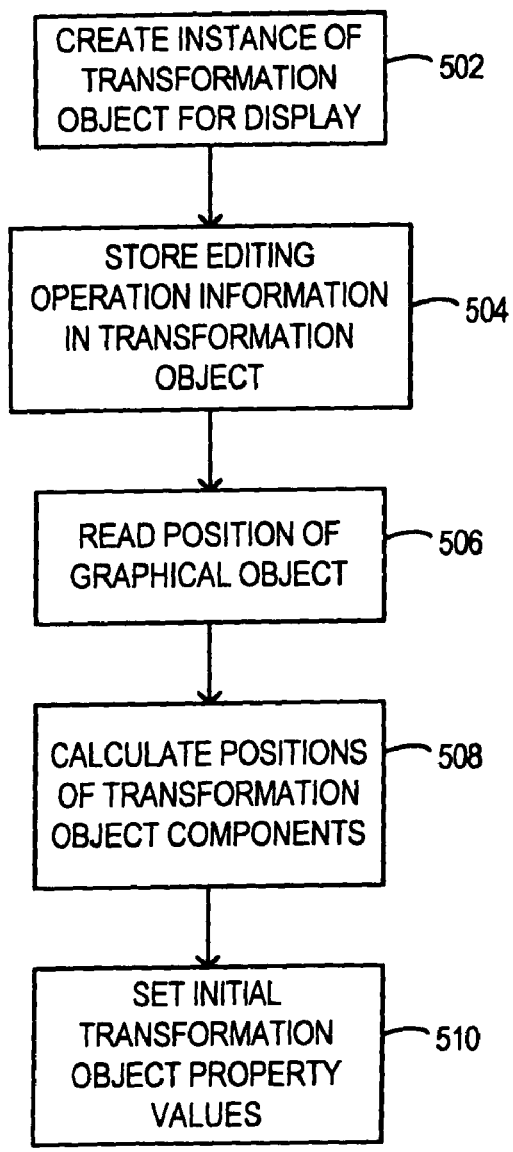
FIG. 5 is a flowchart of a method according to some embodiments.

Referring now to FIG. 5, a method 500 according to some embodiments is shown. In some embodiments, the method 500 may be associated with the exemplary drawings 100, 200 and/or any of the components thereof as described in conjunction with any of FIG. 1 and/or FIG. 2. The method 500 may also or alternatively be associated with the methods 300, 400 and/or any of the procedures thereof. For example, the method 500 may be associated with creating transformation objects to represent transformations to a graphical object.

The method 500 may begin, for example, at 502 to create an instance of a transformation object for display. The transformation object may, for example, be or include the transformation object displayed at 304 and/or the transformation displayed at 418. In some embodiments, the transformation object may also or alternatively comprise an object-oriented and/or other programming object. According to some embodiments, the method 500 may continue to store editing operation information in the transformation object at 504. For example, the transformation object may be created in response to and/or otherwise because of an editing operation performed on a graphical object. The editing operation may transform the graphical object, according to some embodiments, by changing one or more parameter values associated with the graphical object. These parameters and/or the values thereof may, for example, be associated with the transformation object. In some embodiments, one or more of the parameters of the graphical object that are associated with the transformation may be made available via the transformation object to allow a user to easily edit the values.

According to some embodiments, the method 500 may continue at 506 to read position information associated with the graphical object. While the editing operation information may describe how the graphical object is transformed, for example, such information may, in some embodiments, need to be associated with a position of the graphical object (e.g., current position and/or desired position) to allow rendering of the graphical object within a drawing space. The position information may comprise, for example, one or more coordinate values that describe, at least in part, a location of the graphical object. In some embodiments, the position information may be utilized at 508 to calculate one or more positions for the transformation object.

According to some embodiments for example, it may be desirable to position the transformation object with respect to the graphical object. Any components of the transformation object (e.g., center of rotation pointer) may, for example, be positioned dependent upon the position of the graphical object and/or based upon the editing operation information. In some embodiments, one or more pre-defined rules may govern how the transformation object components are positioned with respect to the graphical object and/or with respect to one another. The rules may be utilized, according to some embodiments, to calculate (e.g., at 508) one or more coordinates and/or other locations for the transformation object and/or the components thereof. The transformation object and/or the components thereof may then, for example, be displayed as desired with respect to the graphical object.

In some embodiments, the method 500 may continue to set initial transformation object property values at 510. Various parameters of the transformation object may, for example, be calculated, derived, set, and/or otherwise determined based at least in part on the transformation that led to the creation of the transformation object. In other words, the circumstances under which the transformation object was created may define one or more properties, attributes, and/or other parameters of the transformation object. According to some embodiments, the transformation object may comprise primary and auxiliary parameters. Any transformation object parameters directly associated with and/or defined by the transformation, for example, may be considered primary parameters.

Other parameters that may be utilized to define the transformation object may be considered auxiliary parameters. In the case of a rotational transformation and associated transformation object, for example, the angle and center of rotation may comprise primary parameters. Other parameters, such as minimum and/or maximum rotational extents may be auxiliary parameters that define how the transformation object reacts and/or behaves, but that are not necessarily directly related to the transformation. Such auxiliary parameters may, according to some embodiments, be initially set with default values at 510. The user may then, for example, edit the values of any of the parameters as is desired.

Figure 6:
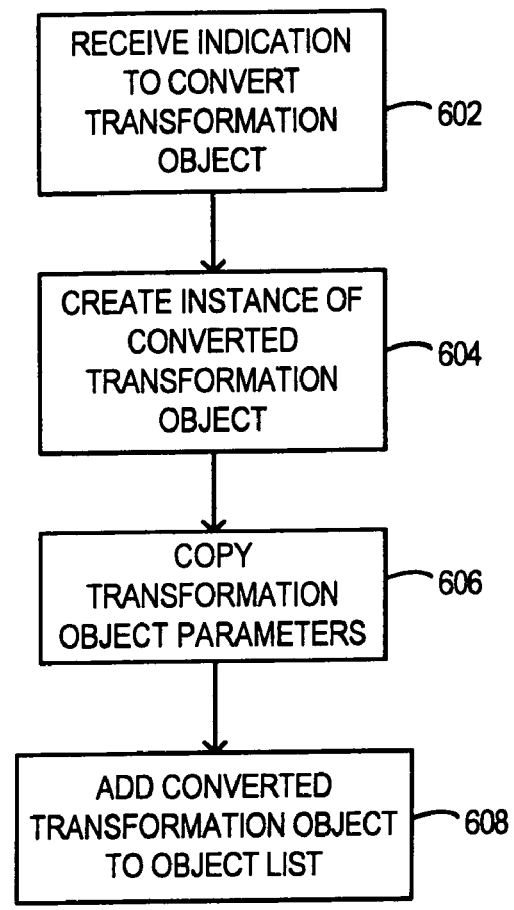
FIG. 6 is a flowchart of a method according to some embodiments.

Turning to FIG. 6, a method 600 according to some embodiments is shown. In some embodiments, the method 600 may be associated with the exemplary drawings 100, 200 and/or any of the components thereof as described in conjunction with any of FIG. 1 and/or FIG. 2. The method 600 may also or alternatively be associated with the methods 300, 400, 500 and/or any of the procedures thereof. For example, the method 600 may be associated with defining a transformation object as a new parameter of a graphical object.

The method 600 may begin, for example, at 602 to receive an indication associated with converting a transformation object. The indication may, for example, be similar to the indication received at 306. In some embodiments, a user may click on and/or otherwise select the transformation object to provide the indication. The user may also or alternatively issue a command directed to converting the transformation object. For example, the user may transform a graphical object in a drawing and click on a thumbtack icon associated with the transformation object displayed to represent the transformation. The method 600 may then continue, for example, to create an instance of the converted transformation object at 604.

In some embodiments, the converted transformation object instance may comprise a programming object such as an object-oriented programming object. The converted transformation object may also or alternatively comprise one or more graphical objects to be displayed to the user. According to some embodiments, the transformation object may appear similar to the converted transformation object. In some embodiments, the converted transformation object may change in appearance to indicate visually that the transformation object has been converted into a new parameter of the graphical object (e.g., a line-type of the transformation object may change as in FIG. 2).

The parameters of the transformation object may, according to some embodiments, be copied at 606. The transformation object parameters may then, according to some embodiments, be utilized to define the parameters of the converted transformation object. According to some embodiments, the conversion of the transformation may not require a copying of values and/or a creation of an instance of the converted transformation object. The converted transformation object may, for example, simply be an updated version of the original transformation object containing new information associating the transformation object as a new parameter of the graphical object. In some embodiments, once the converted transformation object is defined, the converted transformation object may be added to the object list for the drawing, at 608. The converted transformation object may, for example, become an object within the drawing that is editable by the user. In such a manner, for example, the transformation object may provide a graphical interface with which the user may easily define and/or edit parameters (such as derived parameters) of a graphical object.

Figure 7A:
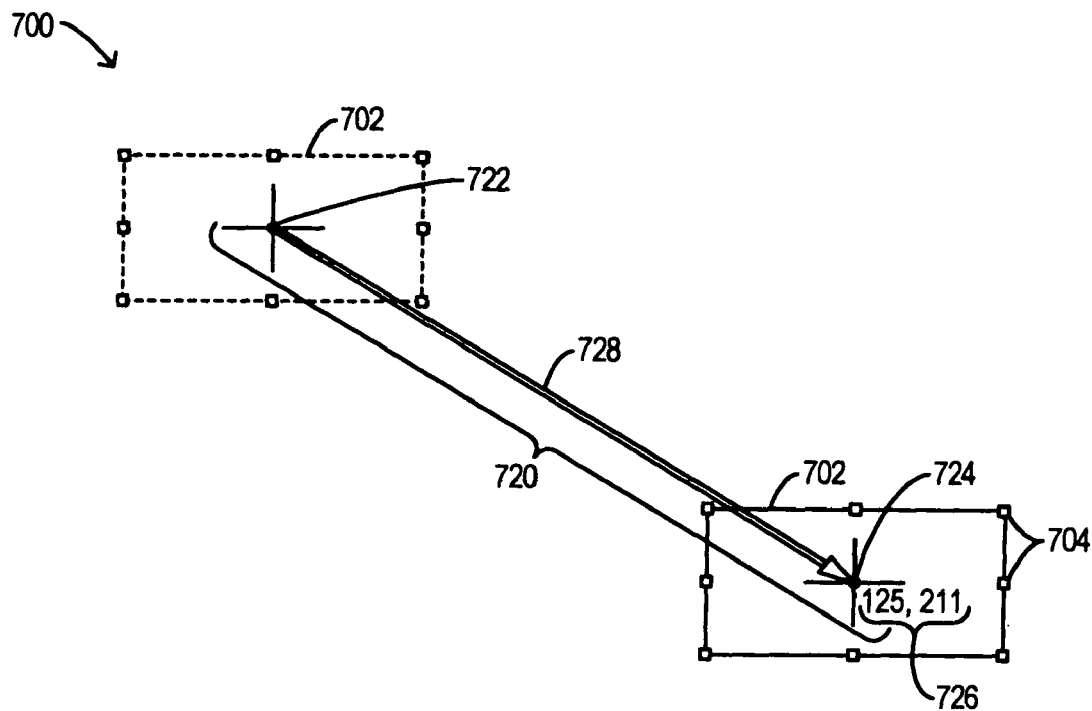
FIGS. 7A & 7B are block diagrams of an exemplary drawing according to some embodiments.
Figure 7B:
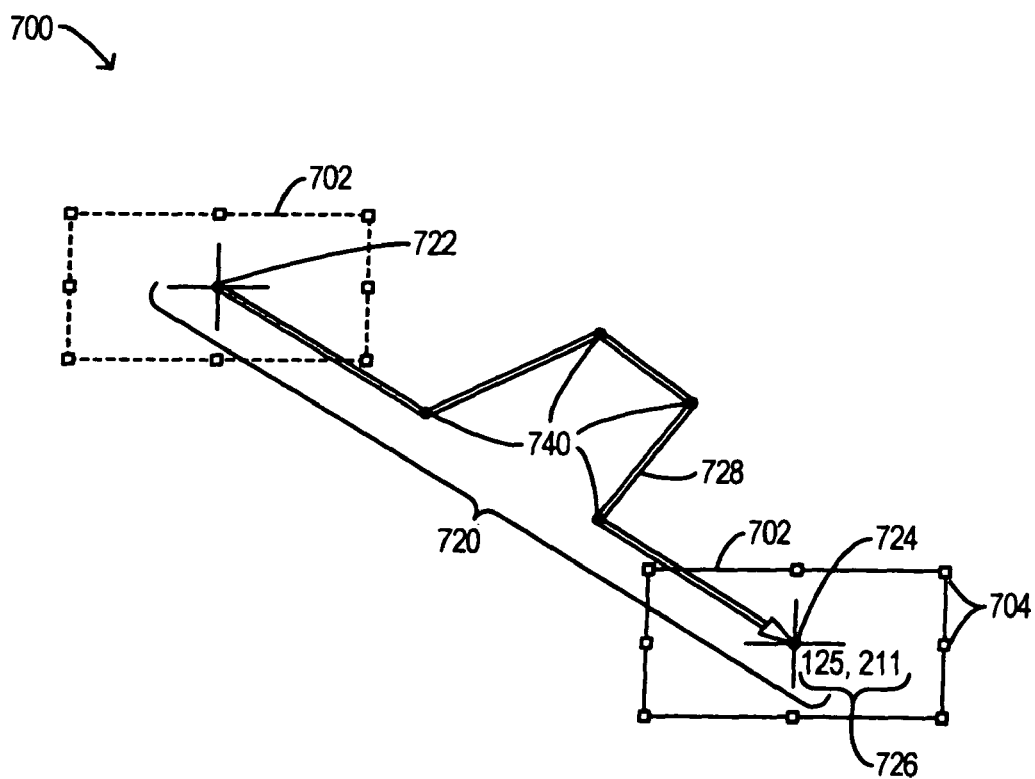

Referring now to FIG. 7A and FIG. 7B, block diagrams of an exemplary drawing 700 according to some embodiments are shown. The drawing 700 may comprise, for example, a graphical object 702 that is selected by a user (e.g., as indicated one or more editing handles 704). According to some embodiments, the graphical object 702 may be transformed (e.g., by translation as shown in FIG. 7A and FIG. 7B) by the user and the transformation may be represented by a transformation object 720. The transformation object 720 may comprise, for example, a start point 722, an end point 724, an end point coordinate label 726, and/or a translation path 728. In some embodiments, the components 702, 704, 720 of the system 700 may be similar in configuration and/or functionality to the similarly-named and/or numbered components described in conjunction with any of FIG. 1 and/or FIG. 2. In some embodiments, fewer or more components than are shown in FIG. 7A and/or FIG. 7B may be included in the exemplary drawing 700.

In some embodiments, the transformation object 720 may be or include an object displayed to represent the transformation of the graphical object 702 in the exemplary drawing 700. The transformation object 720 may, for example, provide visual indication associated with various aspects of the transformation. According to some embodiments, the transformation object 720 may also or alternatively be or include an object displayed to represent one or more parameters of the graphical object 702. The transformation object 720 may itself, for example, be a type of graphical object created by converting a transformation object associated with the transformation to define a new parameter for the graphical object 702.

The transformation object 720 may, according to some embodiments, be (and/or represent) one or more derived parameters of the graphical object 702 that are defined by the movement of the graphical object 702 from the start point 722 to the end point 724. In some embodiments, the transformation object 720 may be editable by the user. The user may, for example, be able to click on (and/or otherwise select) the end point coordinate label 726 to directly enter and/or edit the coordinate value. The user may also or alternatively be able to drag the graphical object 702, the end point 724, and/or the translation path 728 to designate a new and/or different coordinate for the transformation end point 724.

In some embodiments, the user may also or alternatively be able to edit the translation path 728. As shown in FIG. 7B, for example, the user may edit the translation path 728 to define one or more intermediate points 740 along the translation path 728. The intermediate points 740 may, according to some embodiments, be or include inflection points where the translation path 728 changes direction (e.g., as shown in FIG. 7B). In some embodiments, in the case that the user edits the translation path 728 (and/or any other component of the transformation object 720) the user may effectively be altering the value of one or more parameters of the transformation object 720. In turn, according to some embodiments, any related parameters of the graphical object 702 may also be changed (e.g., automatically). In such a manner, for example, the user may easily define new derived parameters for the graphical object 702 based on transformations the user performs on the graphical object 702. The graphical object 702 may then, for example, be easily animated by simply changing the value of the new parameter (e.g., a value of a parameter of the transformation object 720).

Figure 8A:
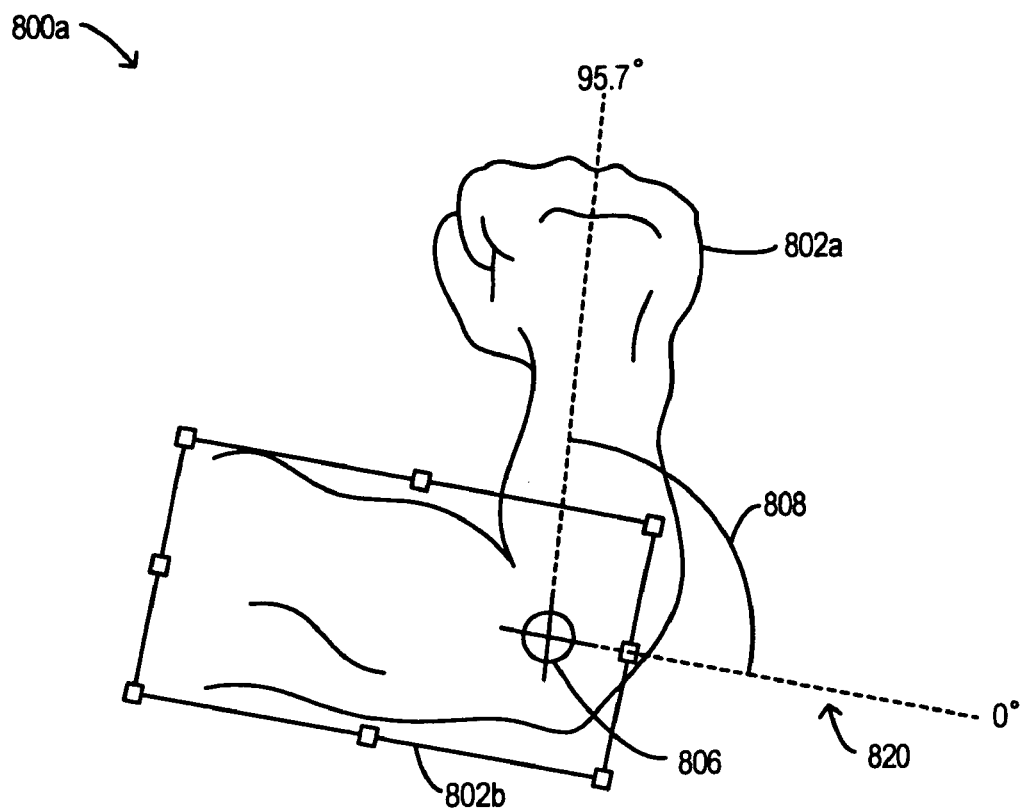
FIGS. 8A & 8B are block diagrams of exemplary drawings according to some embodiments.
Figure 8B:
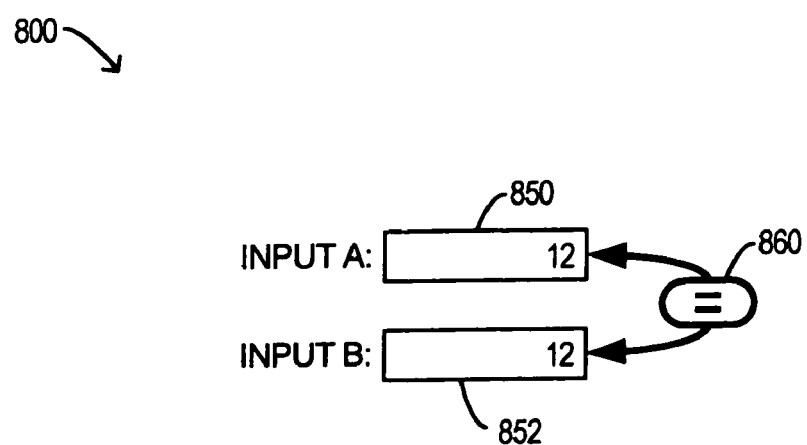

Referring now to FIG. 8A and FIG. 8B, block diagrams of exemplary drawings 800*a*, 800*b* according to some embodiments are shown. In FIG. 8A, for example, a user may create, draw, and/or otherwise define a forearm graphical object 802*a* and/or an upper arm graphical object 802*b*. The user may then, according to some embodiments, transform the forearm graphical object 802*a* by rotating the forearm graphical object 802*a* about a center of rotation pointer 806 to define an angle of rotation 808. As shown by the angle of rotation labels 810, the angle of rotation may, for example, be ninety-five and seven tenths degrees. A transformation object 820 may, in some embodiments, be displayed in the drawing 800*a* to represent the transformation (e.g., the rotation) of the forearm graphical object 802*a*. According to some embodiments and/or in accordance with the methods 300, 400, 500, 600 described herein, the user may select the transformation object 820 to indicate that the transformation object 820 and/or the transformation associated therewith is desired to be converted into and/or defined as a new parameter of the forearm graphical object 802*a*.

In such a manner, for example, the transformation object 820 may become a part of the exemplary drawing 800*a* capable of being manipulated by the user. The user may, according to some embodiments, group the transformation object 820 to the upper arm graphical object 802*b* to create an elbow joint, for example. In other words, the center of rotation pointer 806 of the transformation object 820 may be grouped to a point near one end of the upper arm graphical object 802*b* to allow the graphical objects 802*a*-*b* to be connected in a rotational manner. In other words, the user may define constraints associating the transformation object 820 (and thereby the forearm graphical object as well) to other graphical objects 802*b* within the exemplary drawing 802*a*.

In FIG. 8B, the exemplary drawing 800*b* may, according to some embodiments, comprise a first input box 850 and/or a second input box 852. The input boxes 850, 852 may, for example, represent components of a form allowing a user to input data. In some embodiments, the input boxes 850, 852 may comprise various parameters such as size, position, label text, and/or input value. As shown in FIG. 8B, for example, the input boxes 850, 852 may both be associated with the same input value of twelve. According to some embodiments, in the case that a user sets the input values of the input boxes 850, 852 to be equal, an inferred transformation object 860 may be displayed in the drawing 800*b*. For example, because the two input values are equal, it may be inferred that the user may desire to link the two input values. As shown in FIG. 8B, the inferred transformation object 860 may tie the two input values together.

The user may then, for example, select the inferred transformation object 860 if the user desires to define the link between the two input values as a new parameter linking the input boxes 850, 852. According to some embodiments, a graphical editing tool may comprise logic to determine when and/or how to display an inferred transformation object 860. Programming by demonstration techniques may be utilized, for example, to infer when transformations are likely to be part of larger editing operations and/or heuristics may be utilized to recognize constraints (and/or likely constraints) between transformed graphical objects and other graphical objects within the drawing 800*b*. In some embodiments, the only difference between a transformation object such as the transformation objects 220, 720, 820 described in conjunction with the exemplary drawings 200, 700, 800*a* and an inferred transformation object 860 may be the conditions upon which the objects 220, 720, 820, 860 appear. The inferred transformation object 860 may be displayed and/or created in response to pattern matching over a series of received user commands, for example, while the transformation objects 220, 720, 820 may be displayed and/or created based on a single received user command.

Figure 9:
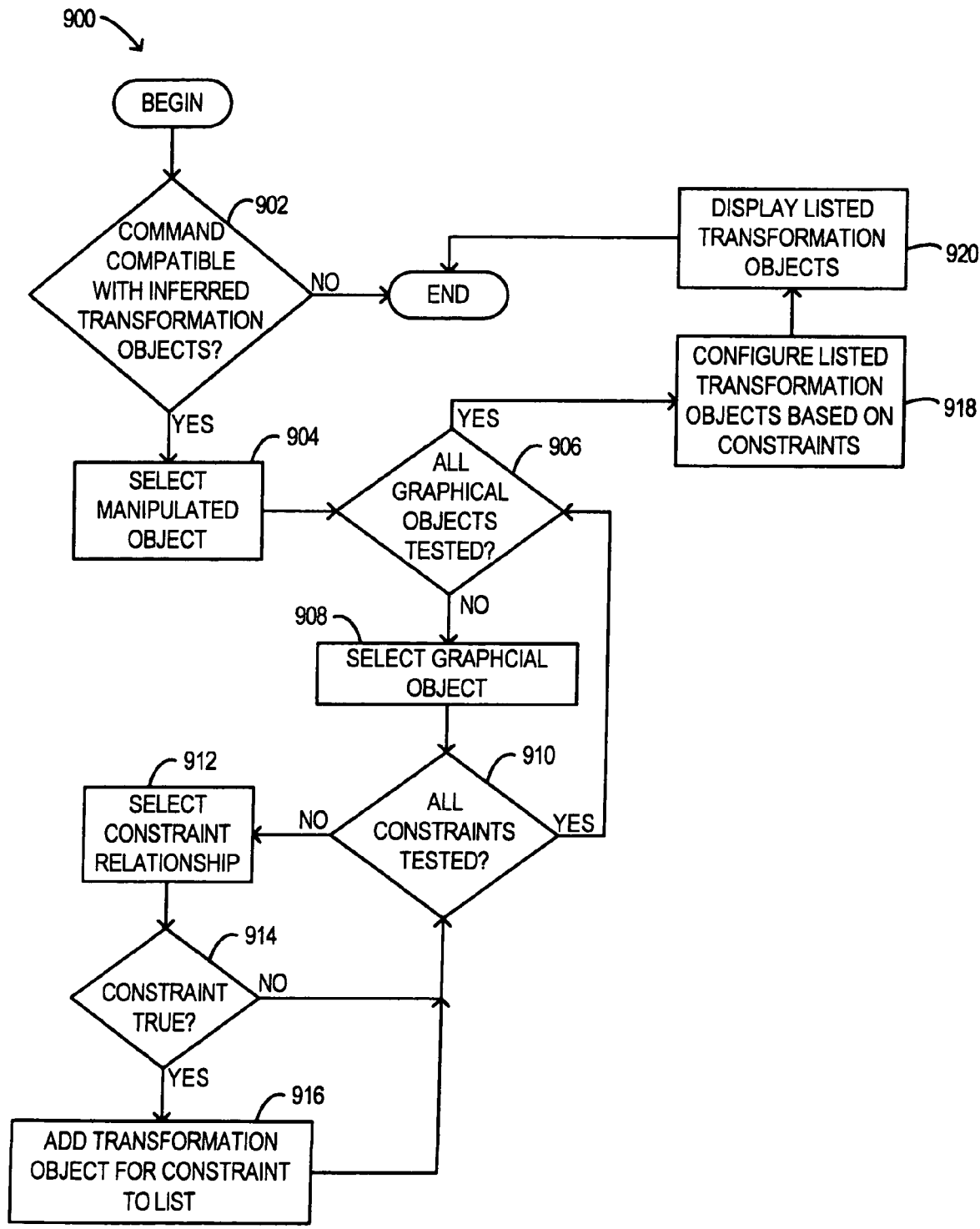
FIG. 9 is a flowchart of a method according to some embodiments.

Turning to FIG. 9, for example, a method 900 according to some embodiments is shown. In some embodiments, the method 900 may be associated with the exemplary drawings 100, 200, 700, 800*a*-*b* and/or any of the components thereof as described in conjunction with any of FIG. 1, FIG. 2, FIG. 7, FIG. 8A, and/or FIG. 8B. The method 900 may also or alternatively be associated with the methods 300, 400, 500, 600 and/or any of the procedures thereof. In some embodiments, the method 900 may be associated with defining, displaying, and/or otherwise manipulating inferred transformation objects (such as the inferred transformation object 860).

The method 900 may begin, for example, at 902 to determine if a received command object is compatible with inferred transformation objects. A graphical editing tool may, for example, analyze the latest received user command (such as a graphical editing operation command) to determine if the command is compatible with the use of inferred transformation objects. In the case that the latest command is not compatible with inferred transformation objects, the method 900 may simply end. For example, if a user performs a transformation upon a graphical object, the graphical editing tool may look-up the transformation type to determine if inferred transformation objects may be associated with the transformation. It may be desirable, for example, to infer object relationships for some editing operations, while other editing operations may not be suitable for inferring relationships and/or constraints there from. In some embodiments, a list and/or other data store may be kept that describes which editing operations may be compatible with inferred transformation objects.

In the case that the latest command is determined to be compatible with inferred transformation objects (e.g., at 902), the method 900 may continue, for example, to select the manipulated object at 904. In other words, the graphical object upon which a transformation was performed and that resulted in the receipt of the latest command may be selected. At 906, according to some embodiments, the method 900 may continue to determine if all graphical objects in the drawing have been tested. The transformed graphical object may be tested, for example, against other graphical objects in the drawing to determine if any relationships may be inferred between the graphical objects. In the case that other graphical objects besides the transformed graphical object exist in the drawing and/or have not been tested, the method 900 may continue to select a graphical object at 908.

Any method and/or procedure for choosing one or more of any graphical objects within the drawing to compare to the transformed graphical object may be used. Graphical objects may be selected from left to right or based on a distance and/or amount of overlap with the transformed graphical object, for example. At 910, the method 900 may continue, according to some embodiments, to determine if all possible constraints between the graphical objects have been tested. Any number of possible and/or potential constraints may exist, for example, between the transformed graphical object and the selected graphical object. In some embodiments, each constraint possible for each graphical object desired to be tested may be analyzed. In the case that all constraints have not yet been tested, for example, the method 900 may continue to select a constraint relationship at 912.

According to some embodiment, any method and/or procedure may be utilized to select an available constraint relationship to test. The graphical editing tool may, for example, weigh the available, likely, and/or possible constraint relationships and select the most probable and/or highest ranking of the available relationships to test. The selected constraint relationship may be tested, for example, at 914 to determine if the constraint is true. In the case that the constraint relationship is determined to be valid the method 900 may continue, in some embodiments, to add an inferred transformation object representing the constraint relationship to a list of inferred transformation objects, at 916. The method 900 may then, for example, continue back to determine if more constraints need to be tested at 910. Similarly, in the case that the selected constraint relationship is determined at 914 not to be valid (e.g., the potential relationship between the transformed graphical object and the selected graphical object is determined not to be true), the method 900 may continue back to 910 to determine if other constraints remain to be tested.

In some embodiments, in the case that all available, potential, and/or likely constraints are determined to be tested for the selected graphical object, the method 900 may continue back to 906 to determine if other graphical objects remain to be tested. The method 900 may, for example, loop through any desired number of graphical objects and/or potential constraints in an attempt to determine whether any inferred transformation objects should be displayed (e.g., in response to the transformation). In the case that all desired graphical objects and/or all desired constraints have been determined to have been tested, the loop may end, according to some embodiments, sending the method 900 to 918 to configure the listed inferred transformation objects based on the underlying constraints. Any inferred transformation objects added to the list of inferred transformation objects (e.g., at 916) may, for example, be populated with the appropriate data associated with the transformation and the inferred relationship between the transformed graphical object and the other graphical objects in the drawing. In some embodiments, the configured inferred transformation objects may then be displayed at 920. The user may then, for example, decide whether any of the inferred transformation objects are desirable to convert to new parameters of the transformed graphical object. In such a manner, for example, the graphical editing tool may utilize logic to provide the user with inferred transformation objects representing potential and/or likely relationships that the user may desire to convert to graphical object parameters.

Figure 10:
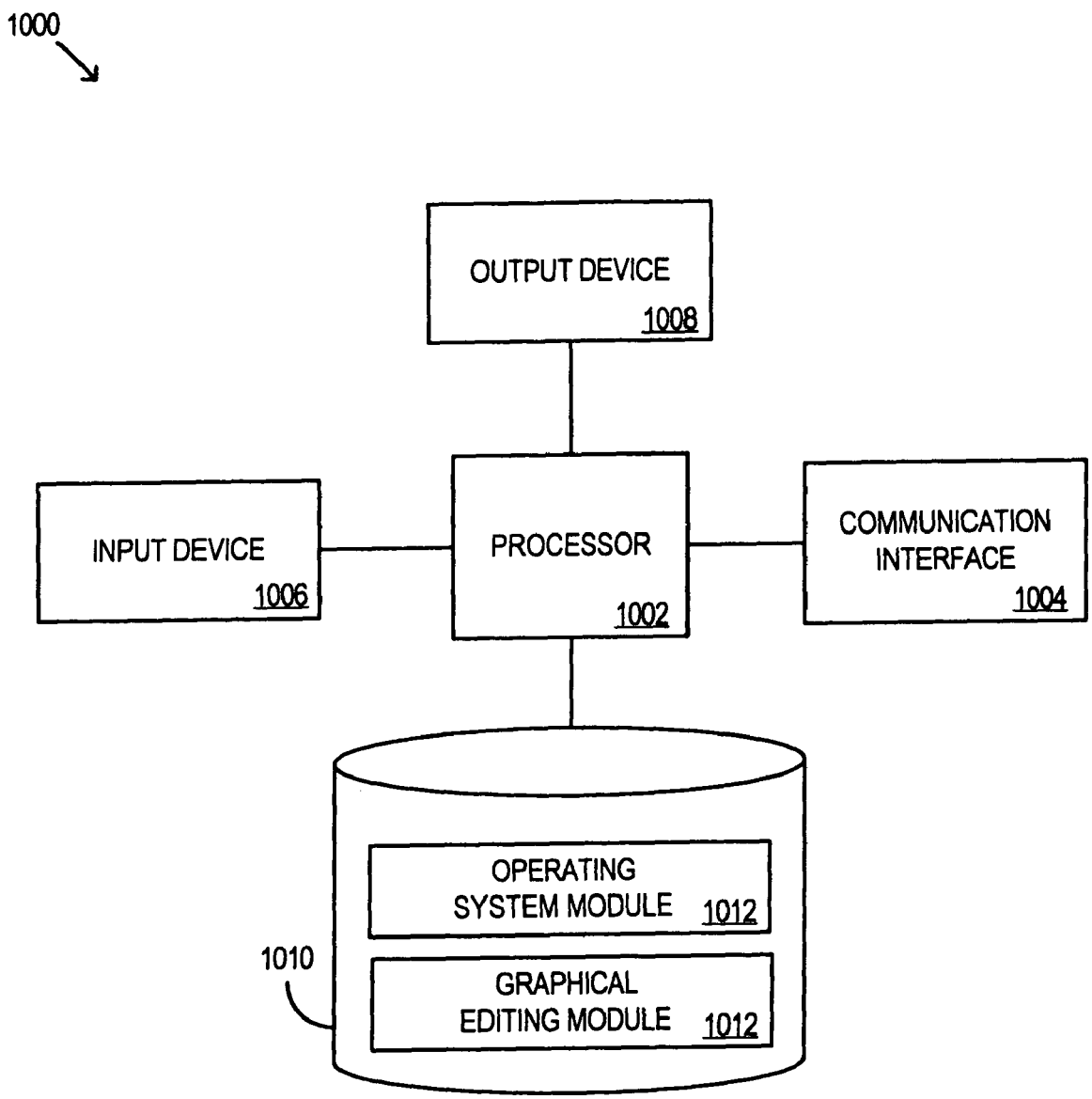
FIG. 10 is a block diagram of a system according to some embodiments.

Referring now to FIG. 10, a block diagram of a system 1000 according to some embodiments is shown. The system 1000 may, for example, be utilized to implement and/or perform the methods 300, 400, 500, 600, 900 described herein and/or may be associated with the exemplary drawings 100, 200, 700, 800a-b described in conjunction with any of FIG. 1, FIG. 2, FIG. 3, FIG. 4, FIG. 5, FIG. 6, FIG. 7A, FIG. 7B, FIG. 8A, FIG. 8B, and/or FIG. 9. In some embodiments, fewer or more components than are shown in FIG. 10 may be included in the system 1000. According to some embodiments, different types, layouts, quantities, and configurations of systems may be used.

In some embodiments, the system 1000 may be or include a computer such as a PC, a notebook, a server, and/or a Personal Digital Assistant (PDA). In some embodiments, the system 1000 may include one or more processors 1002, which may be any type or configuration of processor, microprocessor, and/or micro-engine that is or becomes known or available. In some embodiments, the system 1000 may also or alternatively include a communication interface 1004, an input device 1006, an output device 1008, and/or a memory device 1010, all and/or any of which may be in communication with the processor 1002. The memory device 1010 may store, for example, an operating system module 1012 and/or a graphical editing module 1014.

The communication interface 1004, the input device 1006, and/or the output device 1008 may be or include any types and/or configurations of devices that are or become known or available. According to some embodiments, the input device 1006 may include a keypad, a mouse, a digitizer, one or more buttons, and/or one or more softkeys and/or variable function input devices. The communication interface 1004 may, according to some embodiments, allow the system 1000 to communicate with various other devices, systems, and/or computers a desired.

The memory device 1010 may be or include, according to some embodiments, one or more magnetic storage devices, such as hard disks, one or more optical storage devices, and/or solid state storage. The memory device 1010 may store, for example, the operating system module 1012 and/or the graphical editing module 1014. The modules 1012, 1014 may be any type of applications, modules, programs, and/or devices that are capable of facilitating improved graphical parameter definition. Either or both of the operating system module 1012 and/or the graphical editing module 1014 may, for example, comprise instructions that cause the processor 1002 to operate the system 1000 in accordance with embodiments as described herein.

For example, the graphical editing module 1014 may be operable to receive input (e.g., via the input device 1006) from a user associated with creating, defining, and/or editing graphical objects. According to some embodiments, the graphical editing module 1014 may display transformation objects (e.g., via the output device 1008) to the user to represent transformations the user may perform to a graphical object. The graphical editing module 1014 may also or alternatively receive input from the user that is associated with defining the transformation and/or transformation object as a new parameter of the graphical object. In some embodiments, the graphical editing module 1014 may then, for example, covert the transformation object into and/or define the transformation object as a new parameter of the graphical object, as desired.

According to some embodiments, the system 1000 may comprise a computer operated by a user. The input device 1006 may comprise a mouse and/or keyboard, for example, and/or the output device 1008 may comprise any type of display device that is or becomes known. The memory 1010 may store the graphical editing module 1014 which may, for example, comprise a graphical editing tool configured to implement embodiments as described herein. In some embodiments, the user may interface with the graphical editing tool to easily and/or quickly define one or more transformations and/or editing operations as new parameters (e.g., derived parameters) of the transformed graphical object. In such a manner, for example, structured images and/or groups of structured images may be easily manipulated to provide various forms of animation, motion, and/or other dynamic constraints. In some embodiments, the graphical editing tool may allow the user to define parameters by using graphical editing techniques within a single graphical software application.

The several embodiments described herein are solely for the purpose of illustration. Persons skilled in the art will recognize from this description that other embodiments may be practiced with modifications and alterations limited only by the claims.

What is claimed is:

1. A method, comprising:
   receiving, by a graphical editing tool of a computer, a command associated with a graphical editing operation directed to performing a transformation to a graphical object, wherein the transformation is associated with changing a value of a first parameter of the graphical object;
   displaying, by the graphical editing tool, a transformation object associated with the transformation, wherein the transformation object comprises a second parameter comprising a value associated with the transformation, and wherein the value of the first parameter of the graphical object is related to the value of the second parameter;
   receiving, by the graphical editing tool, an indication to convert the transformation object into a new parameter of the graphical object;
   converting, by the graphical editing tool, the transformation object into the new parameter of the graphical object;
   retaining, by the graphical editing tool, the converted transformation object during operations on other objects; and
   determining a function that defines the value of the first parameter based upon the value of the second parameter;
   wherein the new parameter comprises a derived parameter formed from expressions and/or functions that relate the derived parameter to one or more other parameters of the graphical object.

2. The method of claim 1, further comprising:
   determining to display the transformation object.

3. The method of claim 2, wherein the determining to display the transformation object comprises:
   determining a type of the graphical editing operation; and
   determining that the transformation object is associated with the type of the graphical editing operation.

4. The method of claim 2, wherein the determining to display the transformation object comprises:
   determining one or more rules associated with displaying the transformation object.

5. The method of claim 4, wherein the transformation object is displayed in accordance with the one or more rules.

6. The method of claim 4, wherein the one or more rules define how the transformation object is to be displayed with respect to the graphical object.

7. The method of claim 1, further comprising:
   determining the value of the second parameter.

8. The method of claim 7, wherein the determining of the value of the second parameter comprises:
   determining that the second parameter is associated with the transformation object; and
   identifying the value within information associated with the transformation.

9. The method of claim 7, wherein the determining of the value of the second parameter comprises:
   calling a procedure associated with the transformation object, wherein the procedure is operable to determine the value of the second parameter by identifying the value within information associated with the transformation.

10. The method of claim 1, further comprising:
    receiving an indication to change the value of the second parameter; and
    applying the function to the value of the second parameter to determine a new value for the first parameter.

11. The method of claim 1, further comprising:
    determining a function that defines the value of the second parameter based upon the value of the first parameter.

12. The method of claim 11, further comprising:
    receiving an indication to change the value of the first parameter; and
    applying the function to the value of the first parameter to determine a new value for the second parameter.

13. The method of claim 1, wherein the receiving of the indication to convert the transformation object into a new parameter of the graphical object comprises:
    receiving an indication of a selection of the transformation object; and
    receiving an indication of a command associated with creating the new parameter.

14. The method of claim 1, further comprising:
    determining a constraint between the graphical object and one or more other graphical objects; and
    selecting the transformation object for display based at least in part on the determined constraint.

15. The method of claim 1, further comprising:
    receiving a command associated with defining a constraint relationship between the transformation object and a second graphical object comprising a third parameter;
    defining a function that relates a value of the third parameter and the value of the second parameter in accordance with the constraint relationship; and
    defining the function as a new parameter of at least one of the transformation object or the second graphical object.

16. The method of claim 1, wherein the first parameter comprises a plurality of parameters.

17. The method of claim 1, wherein the graphical editing tool is utilized to define the graphical object.

18. The method of claim 1, further comprising:
    receiving, by a graphical editing tool, two input values; and
    displaying, by the graphical editing tool, an inferred transformation object that ties the two input values together.

19. The method of claim 18, further comprising:
    creating the inferred transformation object in response to pattern matching over a series of received user commands.

20. The method of claim 18, further comprising:
    creating the transformation object;
    wherein creating the transformation object comprises choosing at least one graphical object to compare to a transformed graphical object.

21. The method of claim 20, further comprising:
    editing the graphical object defined by the transformation object.

22. The method of claim 18, further comprising:
    testing a number of graphical objects and/or potential constraints to determine whether the inferred transformation object should be displayed.

23. The method of claim 1, further comprising:
    changing the transformation object in appearance to indicate that the transformation object has been converted into the new parameter of the graphical object.

24. The method of claim 23, wherein the converted transformation object comprises the second parameter comprising the value associated with the transformation.

25. The method of claim 1, further comprising:
    defining the transformation object as a graphical object.

26. The method of claim 1, further comprising:
hiding, by the graphical editing tool, the converted transformation object during the operations on the other objects.

27. The method of claim 26, further comprising:
displaying, by the graphical editing tool, the converted transformation object if the graphical object is selected after the operations on the other objects.

28. The method of claim 26, wherein the converted transformation object comprises the second parameter comprising the value associated with the transformation.

29. The method of claim 1, wherein the converted transformation object comprises the second parameter comprising the value associated with the transformation.

30. The method of claim 1, wherein the transformation object provides a visual indication of the transformation;
wherein the displaying, by the graphical editing tool, a transformation object associated with the transformation comprises:
displaying, by the graphical editing tool, a transformation object that provides a visual indication of the transformation;
wherein the receiving, by the graphical editing tool, an indication to convert the transformation object into a new parameter of the graphical object comprises:
after displaying the transformation object that provides a visual indication of the transformation, receiving, by the graphical editing tool, an indication from the user to define the transformation as a new parameter of the graphical object; and
wherein the converting, by the graphical editing tool, the transformation object into the new parameter of the graphical object comprises:
after receiving the indication from the user to define the transformation as a new parameter of the graphical object, defining, by the graphical editing tool, the transformation as the new parameter of the graphical object.

31. A system, comprising:
a memory configured to store instructions;
a communication port; and
a processor coupled to the memory and the communication port, the processor being configured to execute the stored instructions to:
receive a command associated with a graphical editing operation directed to performing a transformation to a graphical object, wherein the transformation is associated with changing a value of a first parameter of the graphical object;
display a transformation object associated with the transformation, wherein the transformation object comprises a second parameter comprising a value associated with the transformation, and wherein the value of the first parameter of the graphical object is related to the value of the second parameter;
receive an indication to convert the transformation object into a new parameter of the graphical object;
convert the transformation object into the new parameter of the graphical object;
retain the converted transformation object during operations on other objects; and
determine a function that defines the value of the first parameter based upon the value of the second parameter;
wherein the new parameter comprises a derived parameter formed from expressions and/or functions that relate the derived parameter to one or more other parameters of the graphical object.

32. The system of claim 31, wherein the converted transformation object comprises the second parameter comprising the value associated with the transformation.

33. An article of manufacture, comprising:
a tangible computer usable storage medium having computer readable program code means embodied therein for operating a graphical editing tool, comprising:
computer readable program code means for receiving a command associated with a graphical editing operation directed to performing a transformation to a graphical object, wherein the transformation is associated with changing a value of a first parameter of the graphical object;
computer readable program code means for displaying a transformation object associated with the transformation, wherein the transformation object comprises a second parameter comprising a value associated with the transformation, and wherein the value of the first parameter of the graphical object is related to the value of the second parameter;
computer readable program code means for receiving an indication to convert the transformation object into a new parameter of the graphical object;
computer readable program code means for converting the transformation object into the new parameter of the graphical object and retaining the converted transformation object during operations on other objects; and
computer readable program code means for determining a function that defines the value of the first parameter based upon the value of the second parameter;
wherein the new parameter comprises a derived parameter found from expressions and/or functions that relate the derived parameter to one or more other parameters of the graphical object.

34. The article of claim 3, wherein the converted transformation object comprises the second parameter comprising the value associated with the transformation.

35. A method, comprising:
receiving, by a graphical editing tool of a computer, a command associated with a graphical editing operation directed to performing a transformation to a graphical object, wherein the transformation is associated with changing a value of a first parameter of the graphical object;
displaying, by the graphical editing tool, a transformation object associated with the transformation, wherein the transformation object comprises a second parameter comprising a value associated with the transformation, and wherein the value of the first parameter of the graphical object is related to the value of the second parameter;
receiving, by the graphical editing tool, an indication to convert the transformation object into a new parameter of the graphical object;
converting, by the graphical editing tool, the transformation object into the new parameter of the graphical object;
retaining, by the graphical editing tool, the converted transformation object during operations on other objects;
receiving, by a graphical editing tool, two input values; and
displaying, by the graphical editing tool, an inferred transformation object that ties the two input values together.

36. The method of claim 35, further comprising:
creating the inferred transformation object in response to pattern matching over a series of received user commands.

37. The method of claim 35, further comprising:
creating the transformation object;
wherein creating the transformation object comprises choosing at least one graphical object to compare to a transformed graphical object.

38. The method of claim 35, further comprising:
testing a number of graphical objects and/or potential constraints to determine whether the inferred transformation object should be displayed.

39. A method, comprising:
receiving, by a graphical editing tool of a computer, a command associated with a graphical editing operation directed to performing a transformation to a graphical object, wherein the transformation is associated with changing a value of a first parameter of the graphical object;
displaying, by the graphical editing tool, a transformation object that provides a visual indication of the transformation, wherein the transformation object comprises a second parameter comprising a value associated with the transformation, and wherein the value of the first parameter of the graphical object is related to the value of the second parameter;
after displaying the transformation object that provides a visual indication of the transformation, receiving, by the graphical editing tool, an indication from the user to define the transformation as a new parameter of the graphical object;
after receiving the indication from the user to define the transformation as a new parameter of the graphical object, defining, by the graphical editing tool, the transformation as the new parameter of the graphical object;
retaining, by the graphical editing tool, the new parameter of the graphical object during operations on other objects;
wherein the new parameter comprises a derived parameter formed from expressions and/or functions that relate the derived parameter to one or more other parameters of the graphical object.

* * * * *